United States Patent
Bhadra et al.

(10) Patent No.: US 9,001,870 B2
(45) Date of Patent: Apr. 7, 2015

(54) T/R FIRST AND SECOND INTERVALS FOR STROBES AND DATA PACKETS

(75) Inventors: Sandeep Bhadra, Dallas, TX (US); Soon-Hyeok Choi, Allen, TX (US); Xiaolin Lu, Plano, TX (US)

(73) Assignee: Texas Instruments Incorporated, Dallas, TX (US)

(*) Notice: Subject to any disclaimer, the term of this patent is extended or adjusted under 35 U.S.C. 154(b) by 35 days.

(21) Appl. No.: 13/491,982

(22) Filed: Jun. 8, 2012

(65) Prior Publication Data
US 2012/0314739 A1    Dec. 13, 2012

Related U.S. Application Data

(60) Provisional application No. 61/495,795, filed on Jun. 10, 2011.

(51) Int. Cl.
*H04B 1/38* (2006.01)
*H04W 52/02* (2009.01)
*H04W 40/24* (2009.01)

(52) U.S. Cl.
CPC ........ *H04W 52/0229* (2013.01); *H04W 40/246* (2013.01); *H04W 52/0238* (2013.01)

(58) Field of Classification Search
None
See application file for complete search history.

(56) References Cited

U.S. PATENT DOCUMENTS

| | | | |
|---|---|---|---|
| 2005/0009512 A1* | 1/2005 | Rue | 455/420 |
| 2008/0165717 A1* | 7/2008 | Chen et al. | 370/312 |
| 2012/0213124 A1* | 8/2012 | Vasseur et al. | 370/255 |
| 2012/0307653 A1* | 12/2012 | Vasseur et al. | 370/252 |
| 2014/0036752 A1* | 2/2014 | Chun et al. | 370/311 |

OTHER PUBLICATIONS

Bhadra, Sandeep et al., "Demo: Achieving a 10x Lifetime Increase with IEEE 802.15.43 Motes," SenSys'11, Nov. 1-4, 2011, (2 pages), Seattle, WA.

IEEE, "Part 15.4: Low-Rate Wireless Personal Area Networks (LR-WPANs), Amendment 1: MAC sublayer," IEEE Standards Association, IEEE Computer Society, Apr. 16, 2012, (225 pages), New York, NY.

* cited by examiner

*Primary Examiner* — Adolf Dsouza
(74) *Attorney, Agent, or Firm* — Lawrence J. Bassuk; Frank D. Cimino

(57) ABSTRACT

The duration of receiver on-times may be minimized by sensing and reacting to communication channel power levels at intervals. When no energy is detected on the communication channel, then the receiver may be turned off for a channel sampling interval. If energy is detected on the channel, then the receiver may remain on to determine if a received message is associated with the device. Receiver on-time may also be minimized by adjusting the timing of messages used for broadcast messages sent by routing or other protocols. Broadcast messages, such as network routing topology messages, may be controlled in two phases. In a first phase, the broadcast messages are sent with at a high rate to allow nodes to join the network rapidly. In a second phase, the broadcast messages are sent with at a lower rate to minimize interference with data and other messages in the network.

23 Claims, 6 Drawing Sheets

T/R FIRST AND SECOND INTERVALS FOR STROBES AND DATA PACKETS

CROSS-REFERENCE TO RELATED APPLICATIONS

This application claims the benefit of the filing date of U.S. Provisional Patent Application No. 61/495,795 which is titled "Radio duty cycle minimization techniques in transmission-initiated wireless multihop network" and was filed Jun. 10, 2011, the disclosure of which is hereby incorporated by reference herein in its entirety.

BACKGROUND

Radio transmitters and receivers are the primary points of energy consumption in wireless devices. The power supplies in wireless devices, such as batteries or energy-harvesting modules, will have a longer life if the communication protocols used by the radio are designed to minimize use of the receiver and transmitter circuits. The communication protocols are used to form network links and to negotiate end-to-end connections between devices. By keeping both transmitter and receiver in an OFF or sleep mode for a large percentage of time, the device will use less energy.

Transmission-initiated duty-cycling is a technique in which a transmitter sends out short strobe packets when the device has data packets that are ready to transmit. The strobe packets are sent intermittently and are triggered when the data packets are generated. The receiver, which is in an OFF or sleep mode most of the time, wakes up (i.e. enters an "ON mode") at the end of every duty-cycle and listens on an assigned wireless channel. If the receiver senses a strobe packet from a transmitter, the receiver recognizes that the transmitter intends to communicate a data packet and, the receiver will stay in an ON mode to receive the data packet. Otherwise, if the receiver does not sense a strobe packet, then the receiver returns to an OFF mode to conserve power. Examples of transmission-initiated duty-cycled medium-access control (MAC) protocols that are designed for small-area networks are the Coordinated Sampled Listening (CSL) mode of the IEEE 802.15.4e protocol and X-MAC protocol.

Large networks of wireless devices, such as sensor nodes or motes, may communicate using CSL. Such sensor networks often operate unattended for months or years. Therefore, battery power in each device must be conserved for the devices to last for long periods.

SUMMARY

Embodiments of the invention provide devices adapted to transmit and receive messages from other devices over a wireless communication channel. The device minimizes power consumption from a battery or other power source by maintaining its receiver and transmitter in an OFF mode as long as possible.

The device activates its receiver at predetermined channel sampling intervals by putting the receiver in an ON mode or an awake state. The receiver monitors energy on the communication channel. The communication channel energy may be detected using a PHY hardware library function in the receiver in one embodiment. The device determines whether communication channel energy has been detected. If no energy is detected, then no other device is transmitting, and the receiver is deactivated by putting the receiver in an OFF mode or a sleep state. The receiver may remain in a deactivated state until a next sampling interval.

If energy is detected, then another node may be transmitting. A strobe packet is received using the receiver. The device determines whether a destination address in the strobe packet matches its address. If the strobe packet is not addressed to the device, then the receiver is deactivated. The receiver may remain off until a next channel sampling interval. In other embodiments, the receiver may remain off for a longer period to allow other devices to transmit data packets.

If the destination address of the strobe packet matches the device, then the device activates the receiver at a rendezvous time to receive a data packet. The rendezvous time may be identified in the strobe packet. The receiver may be turned off between receiving the strobe packet and the rendezvous time to save power or it may remain on for that period.

In one embodiment, the period between activating and deactivating the receiver is a shorter period than a time required to receive an entire strobe packet from another device. This allows the receiver to quickly turn off if no energy is detected.

In some embodiments, if energy is sensed on the communication channel by the receiver and the device has a data packet to be transmitted, then the device may postpone transmission of the data packet by some predetermined back-off interval. This would allow other devices to complete their transmissions on the channel before the device again attempts to transmit its data.

In other embodiments, the device transmits network routing messages in multiple phases according to one embodiment. Therein, a device sets a network routing message timer to a first interval during a first phase. The device transmits a plurality of network routing messages during the first phase at the first interval. The device sets the network routing message timer to a second interval during a second phase. The second interval is selected to reduce transmission of the network routing messages during the second interval.

The first interval and the second interval may be selected to minimize interference between network routing messages and strobe packets transmitted in the network. In one embodiment, the network routing message is a DODAG Information Object (DIO) message.

BRIEF DESCRIPTION OF THE DRAWINGS

Figure 1:
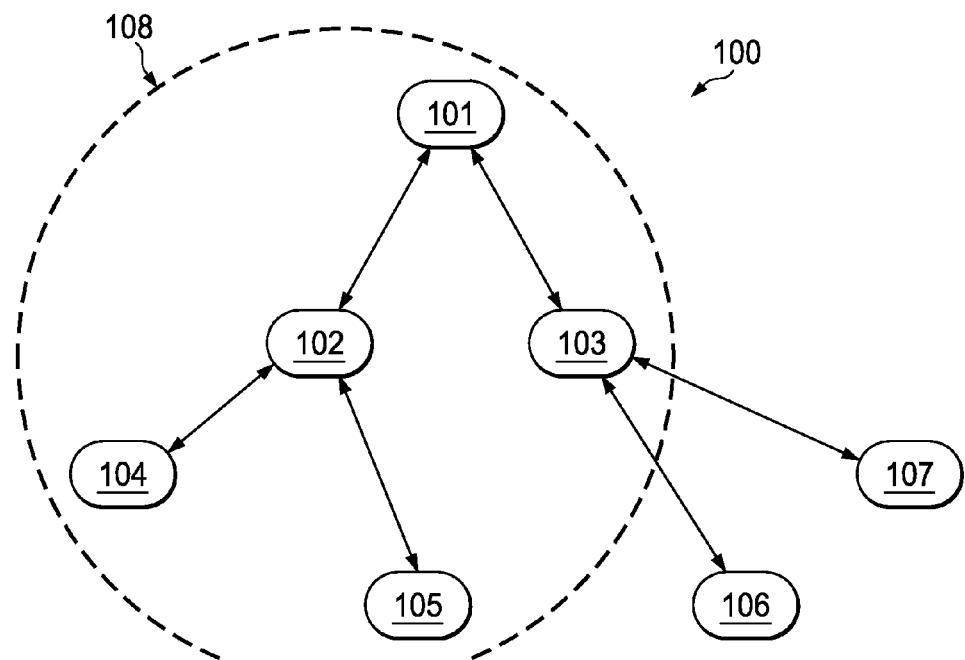

Having thus described the invention in general terms, reference will now be made to the accompanying drawings, wherein:

FIG. 1 illustrates a seven-node mesh network with sensor motes according to one embodiment.

Figure 2:
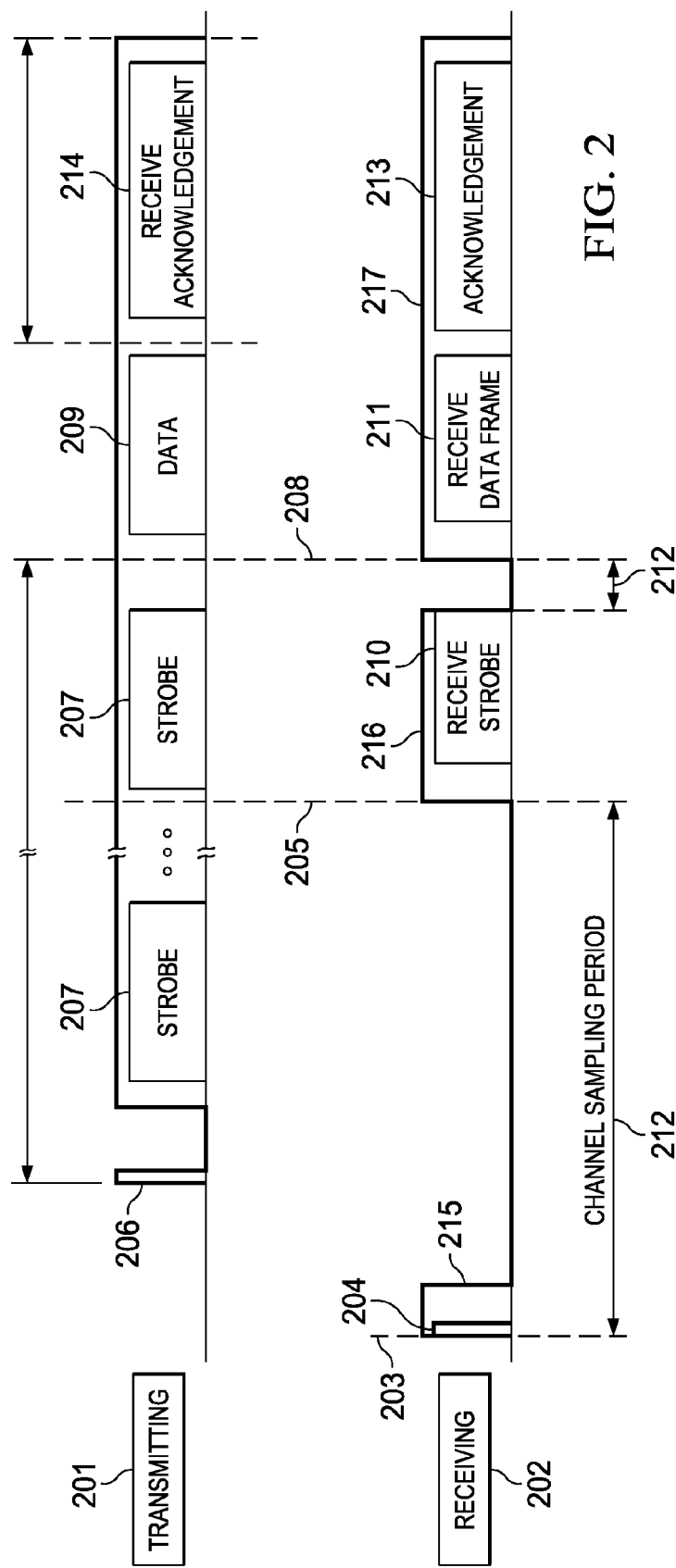

FIG. 2 illustrates the operation of a transmitting node and a receiving node according to one embodiment.

Figure 3:
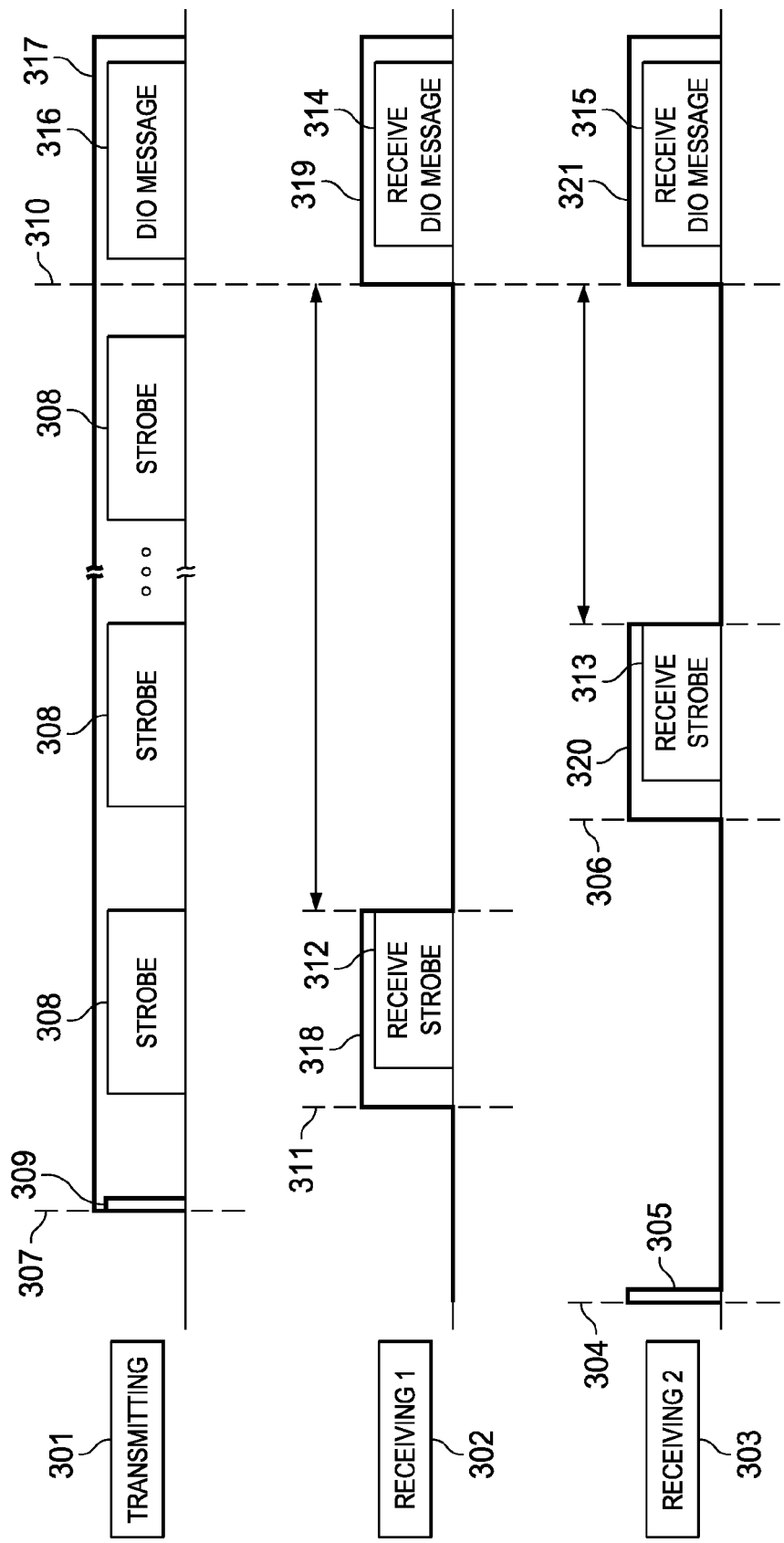

FIG. 3 illustrates messages exchanged in a network when a node 301 broadcasts a routing layer control message, such as a DIO message, to maintain network topology.

Figure 4:
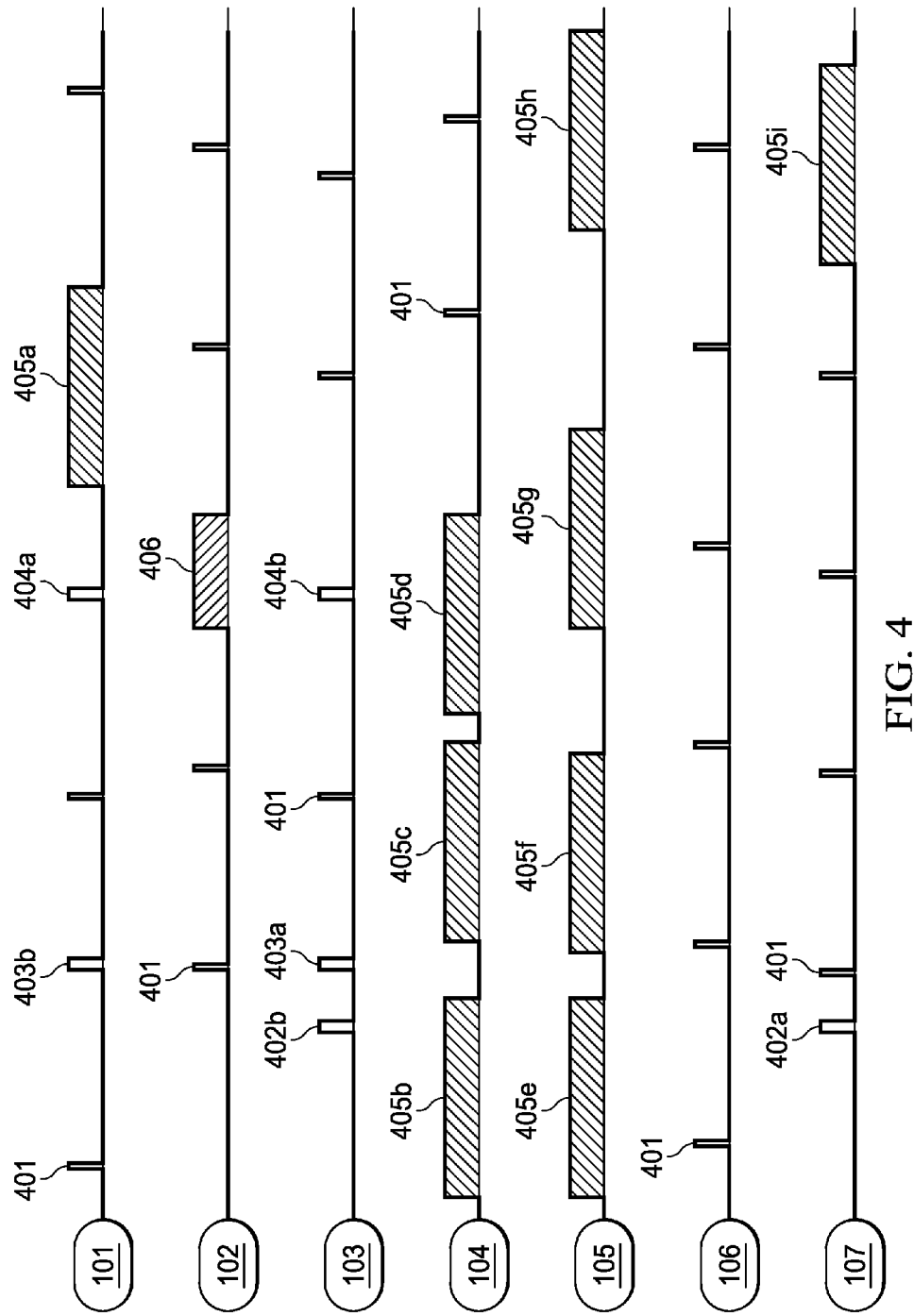

FIG. 4 illustrates broadcast and unicast messages in a network.

Figure 5:
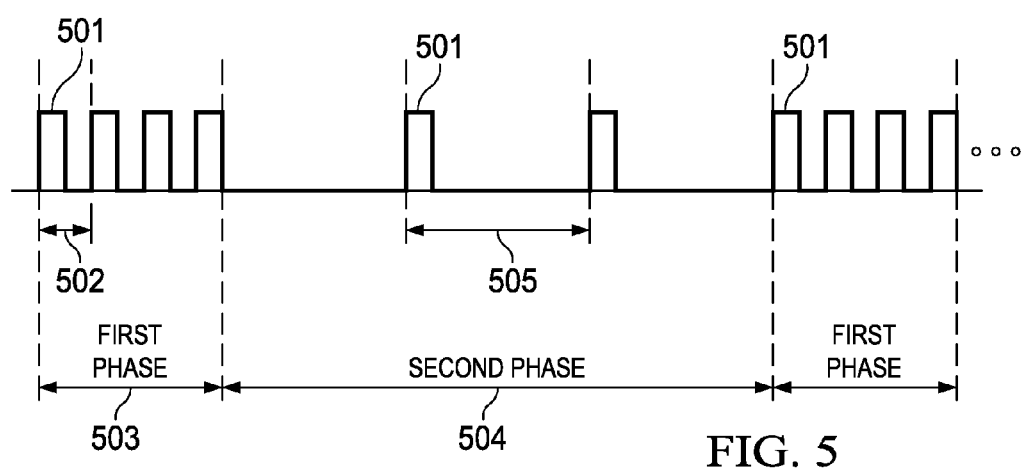

FIG. 5 illustrates alternating a DIO timer between two different phases according to one embodiment.

Figure 6:
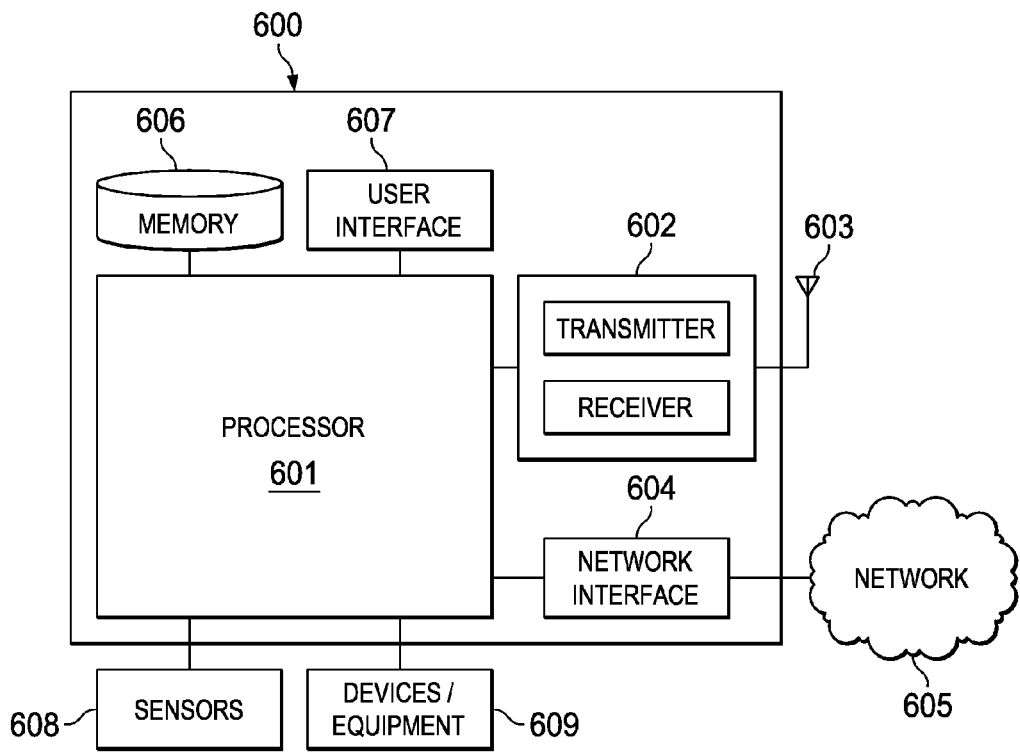

FIG. 6 is a block diagram of an exemplary embodiment of a device implementing embodiments of the invention.

Figure 7:
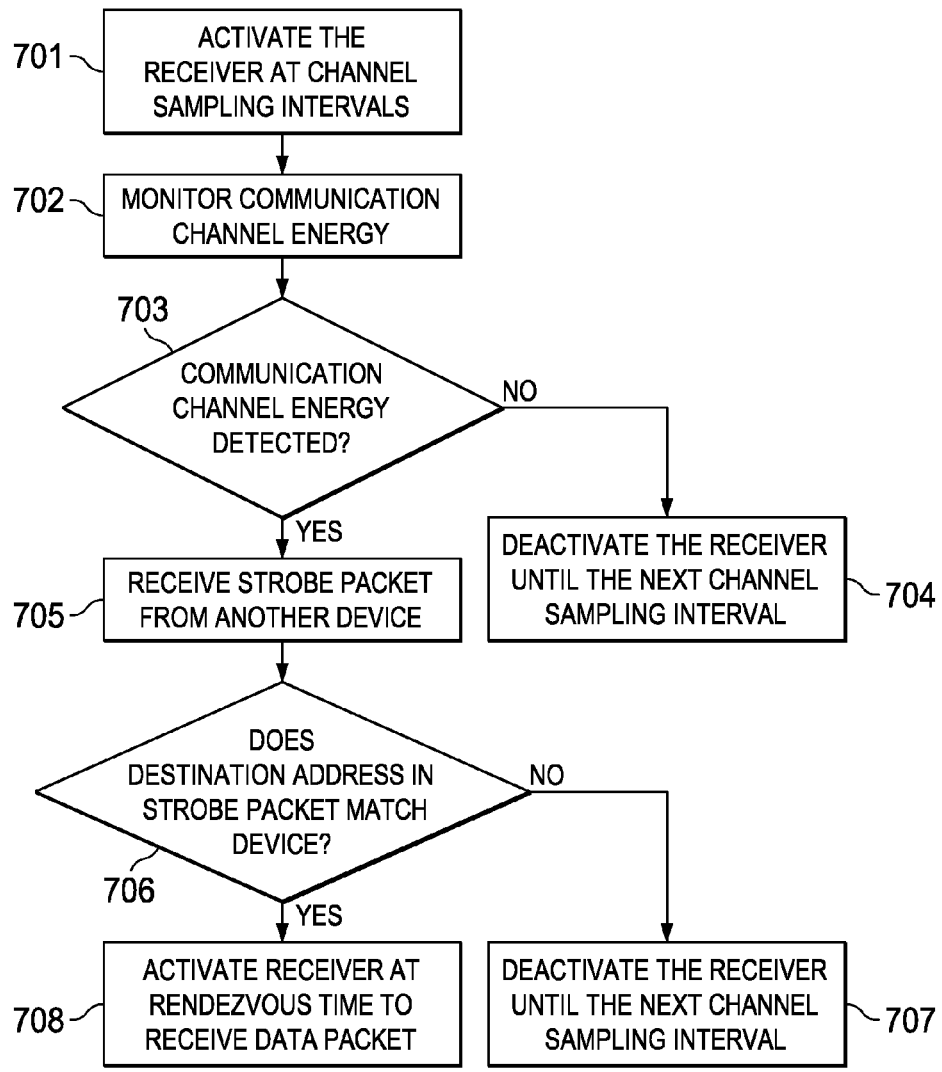

FIG. 7 is a flowchart illustrating a method or process for minimizing receiver on-time according to one embodiment.

Figure 8:
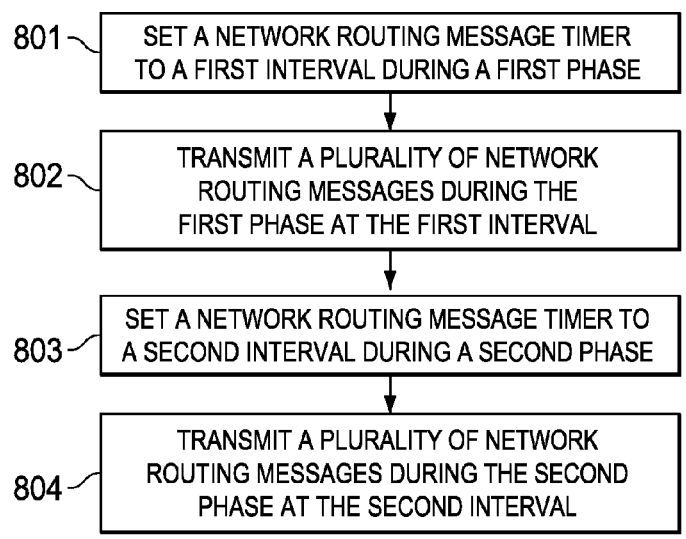

FIG. 8 is a flowchart illustrating a method or process for transmitting network routing messages in multiple phases according to one embodiment.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

The IEEE 802.15.4e Coordinated Sampled Listening (CSL) protocol specification details transmission events and messages, but allows the developer to select radio implementation details, such as how and when the radio cycles between ON and OFF modes. Embodiments of wireless devices described herein keep their radios in an OFF mode for the maximum amount of time to reduce power requirements, but also allow new nodes to join the network in an efficient manner. In one embodiment, a medium access control (MAC) state-machine may be utilized to control the receiver ON/OFF modes.

A MAC state-machine is used to control interactions between a hardware radio and the software or hardware MAC protocol, such as the IEEE 802.15.4e CSL protocol, to minimize the duration of receiver-listening operation. The presence of transmission channel energy may be detected much faster (i.e. within 100's of microseconds) compared to receiving a full strobe-packet over the channel. A PHY hardware library function in the radio is typically used to sense energy on the channel when the receiver is turned ON. If there is no energy in the channel, then the receiver is put in an OFF state by a MAC state-machine to conserve power.

If energy is detected on the channel, then the receiver continues in an ON state. The receiver will remain ON both when it senses packets that are addressed to the receiver itself and when it senses transmissions from other devices even if those packets are directed to other receivers. Upon sensing the channel energy, the receiver receives the strobe packet and parses the MAC header of the packet to identify the intended destination. If the MAC packet is not destined for the receiving device, then the radio enters the OFF state.

The destination address information in strobe packet is also used to postpone packet transmissions by the sensor. For example, if node A's receiver senses channel energy due to a transmission between neighboring nodes B and C, then node A not only turns its receiver OFF, but also postpones any data-packet transmissions from itself to the neighboring nodes. In this way, node A backs off from sending strobe packets on the channel and does not cause interference on the B-C link. This virtual carrier sensing reduces ineffective transmission events and thereby improves power consumption.

FIG. 1 illustrates an example seven-node mesh network 100 with devices 101-107. It will be understood that the methods and techniques described herein may be used with networks having any number of nodes with any hierarchy. Root node 101 communicates with intermediate nodes 102 and 103, which in turn communicate with leaf nodes 104-107. Messages may be exchanged directly between nodes or they may be passed through intermediate nodes. For example, node 102 is capable of detecting transmissions within area 108. Accordingly, when nodes 101, 103, 104 or 105 transmit, node 102 will detect such transmissions. Messages received from these nodes may be processed by nodes 102. In some cases, node 102 may need to pass messages on to other nodes, which may be accomplished using a routing protocol as discussed below. Transmissions by the nodes within area 108 may cause interference with node 102's own transmissions if they occur at the same time. Also, nodes 101-107 may cause interference with each other if they transmit at the same time.

In one embodiment, mesh network 100 may use the Coordinated Sampled Listening (CSL) mode of the IEEE 802.15.4e protocol to exchange messages. During an idle listening time at periodic intervals, each node samples the communication channel by turning on its receiver. If no energy is detected during channel sampling, then the node's receiver is disabled until the next channel sample time—i.e. at the next periodic interval. When a strobe or wakeup frame is detected during the channel sample time, the node checks a destination address in the frame. If the node determines that the destination address matches the node, then it disables the receiver until a rendezvous time in the wakeup frame. The receiver is then enabled at the rendezvous time to receive a payload frame. If the node determines that the destination address does not match the node, then the node disables the receiver until the rendezvous time plus a maximum payload frame and an acknowledge frame transmission time. The destination node corresponding to the destination address receives the payload frame during this time and then the other non-destination nodes can begin sampling the channel again for future transmissions.

FIG. 2 illustrates the operation of a transmitting node 201 and a receiving node 202 according to an example embodiment. The nodes are designated as a transmitting node 201 to illustrate when nodes have a data packet to send or as a receiving node 202 to illustrate when the node does not currently need to send data packets. At channel sample time 203, which occurs at a recurring channel sampling period, receiving node 202 turns on its receiver for one or more channel sampling intervals 204. Receiving node 202 may use a PHY hardware library function in the radio to quickly sense the energy on the channel. If no energy is detected, then receiving node 203 turns OFF its receiver to save power. The duration of intervals 204 need to be only long enough for the PHY hardware library function to sense channel energy. If no channel energy is sensed, then receiving node 202 waits until the next channel sample time 205 to again turn ON its receiver and sense the channel energy.

When transmitting node 201 has data packets to send, it senses the channel energy in one or more channel sampling intervals 206. This allows transmitting node 201 to determine if other nodes are transmitting and thereby avoid interfering with other active nodes. If no energy is detected on the channel, then transmitting node 201 transmits a number of strobes or wakeup messages 207 to the other nodes in the network. Strobes 207 may comprise a frame header and a strobe header that includes a destination address for the data packet and a rendezvous time at which the data packet will be transmitted. Transmitting node 201 continues transmitting strobes 207 at regular intervals until rendezvous time 208, at which time node 201 transmits data frame 209. The content and timing of strobes 207 and data frame 209 may be defined in a protocol such as CSL.

Receiving node 202 turns ON its receiver at channel sample time 205 and this time detects channel energy because transmitting node 201 is transmitting strobes 207. Receiving node 202 leaves the receiver ON to receive strobe 207 during interval 210. Receiving node 202 then determines the destination address and rendezvous time in strobe 207. If the destination address matches the MAC address for receiving node 202, then receiving node 202 will turn ON its receiver at rendezvous time 208 to receive data frame 209 during interval 211. To further conserve power, receiving node 202 may turn OFF the receiver during interval 212 between receiving strobe interval 210 and rendezvous time 208. After receiving data frame 209, receiving node 202 transmits acknowledgement frame 213, which is received by transmitting node 201 during interval 214.

In some embodiments, transmitting node 201 may have knowledge of receiving node 202's periodic channel sampling times or wakeup times 203, 205. For example, after receiving acknowledgement message 213, transmitting node 201 may know receiving node 202's channel sampling times. In this situation, transmitting node 201 can save power by waiting until channel sampling time 205 before transmitting strobes 207. This prevents transmitting node 201 from transmitting strobes while the receiver in node 202 is in an OFF mode.

Using this technique, the radio in receiving node 202 only needs to be in operation during intervals 215, 216 and 217. At other times, the radio receiver and transmitter can be in an OFF mode to conserve power.

In some embodiments, the CSL optimizations described above may not reduce radio duty cycles to optimum levels if other protocols require more frequent transmissions. For example, higher-layer routing protocols, such as RPL (the IPv6 Routing Protocol for Low power and lossy networks) and LOAD, require multicasts (called DIO multicasts in the RPL protocol) and very concentrated transmissions to be broadcast at regular intervals. The requirement to send DIO messages breaks down the assumption of very infrequent transmission events that underlie the MAC optimizations noted above for CSL and X-MAC. Additionally, in-band interference caused by DIO broadcasts from one transmitter may cause data-transmission failures in other nodes and thereby require retransmissions in neighboring links. This all leads to longer radio ON-times and increased power consumption.

RPL is a routing protocol that can operate on top of the IEEE 802.15.4e or other protocols. The routing layer is responsible for relaying packets across multiple hops between source and destination nodes. For example, RPL may be used to route packets between nodes in a mesh network, such as network 100 in FIG. 1. Nodes in a mesh network may be ranked using a gradient called a Destination Oriented Directed Acyclic Graph (DODAG) that indicates how close the node is to a root node. Routing layer broadcast control messages, such as DODAG Information Object (DIO) messages in RPL, are used to exchange control information, such as node-rank information, among the nodes. In RPL, the nodes periodically transmit DIO messages to all neighbors. The receiving nodes use the DIO messages to join the network and to identify neighbor nodes. The broadcasting of the DIO messages may interfere with data messages sent by other nodes at the same time. Accordingly, while the DIO messages are necessary to allow nodes to join the network, these messages may also cause interference because the DIO messages are repeated over a preset period. The interval at which a DIO message is broadcast by a node is determined by a DIO timer.

FIG. 3 illustrates messages exchanged in a network when a node 301 broadcasts a routing layer control message, such as a DIO message, to maintain network topology. In the illustrated example, the DIO messages for RPL are exchanged using the CSL protocol. At time 304, node 303 turns on its receiver and attempts to detect channel energy during listening period 305. If no channel energy is detected, as illustrated, then the node 303 receiver is turned OFF until its next channel sampling interval at time 306.

At time 307, node 301 determines that it has a DIO data packet to broadcast to the other nodes in the network, including nodes 302 and 303. Broadcast traffic, such as DIO messages, require strobing 308 for an entire sampling interval period to guarantee that all neighbors receive a strobe during their respective channel sampling or wakeup intervals. Node 301 listens to the channel for sample interval 309. If no channel energy is detected (i.e. the channel is clear), then node 301 begins transmitting strobe packets 308, which notify the other nodes that a broadcast data packet will be transmitted at rendezvous time 310. The transmission of strobes 308 causes interference with the other network nodes and increases the duty cycle for the whole network. This increases the power consumption of the network nodes.

When node 302 reaches its wakeup interval 311, it detects the channel energy caused by nodes 301's transmissions and stays ON during interval 312 to receive a strobe 308. Node 302 may then turn off its receiver to conserve energy until rendezvous time 310. Similarly, when node 303 wakes up and turns ON its receiver at time 306, it detects the channel energy caused by nodes 301's transmissions and stays ON during interval 313 to receive a strobe 308. Node 303 may then turn off its receiver to conserve energy until rendezvous time 310. At time 310, both nodes 302 and 303 (and any other nodes in the neighborhood that received a strobe 308) turn ON their receivers 314, 315 to receive DIO message 316.

To broadcast routing-topology messages, such as DIO message 316, the radio for the transmitting node must be ON for interval 317, and the radios for the receiving nodes must be ON for at least intervals 318-321.

Anytime a node has to transmit a DIO message, the duty cycle of the nodes increases because they have to listen for the broadcast DIO message. If the DIO timer (i.e. the frequency of multicast DIO messages) is set to a small value, this consumes more transmission power and causes interference due to frequent multicasts. On the other hand, if the DIO timer is set to a high number, then the routing protocols require a long time to settle (i.e. it takes longer for nodes to join the network), which also increases battery power consumption. It has been observed that in the case of very infrequent data traffic, such as on the order of 1 packet/min or 1 packet/10 seconds, radio power consumption is dominated by listening events while the receiver is ON and waiting to detect transmissions.

As described herein, nodes may use cross-layer optimization to reduce interference between DIO messages used by the routing layer and data frames sent via a duty-cycled MAC protocol, such as CSL. RPL must be active at initial network formation to allow nodes to join. Therefore, the DIO messages cannot be eliminated or permanently set to a very infrequent interval. In one embodiment, the network may operate in two phases: a first phase in which the DIO timer is set to a very small duration to aid rapid network formation and update, and a second phase in which the DIO timer is set to a very large duration to minimize DIO multicasts, which will also minimize interference.

In many sensor network applications, the sensors are static motes and, therefore, the RPL routing tree for the network nodes is unlikely to change rapidly. Having a short first phase and a long second phase will result in low overall power consumption, while enabling rapid network formation during the first phase. For example, the first phase may occur for one minute and the second phase may last for tens of minutes or for hours. This would allow for relatively coarse timing-accuracy requirements for the nodes to switch from one phase to another. It will be understood that the DIO timer may be set to any durations for the first phase and for the second phase. It is further understood that the ratio between the duration of the first phase and the duration of the second phase may be set to any value that is appropriate to reduce interference of DIO messages and strobes in the network.

FIG. 4 illustrates broadcast and unicast messages in a network, such as mesh network 100 of FIG. 1. At periodic intervals each node 101-107 listens during a channel sampling interval 401. Nodes exchange unicast messages at intermittent times 402-404 when one of the nodes has data to send. For example, node 107 may have data to send at time 402a, which is received by node 103 at 402b. Node 103 may then forward the data to node 101 at 403a, which is received by node 101 at 403b. The nodes may broadcast network routing-topology messages, such as RPL DIO messages, during intervals 405a-i. The occurrence of routing-topology messages 405 may be controlled by a timer, such as a DIO timer. Each interval 405 includes, for example, a series of strobes and a routing-topology message, such as strobes 308 and DIO message 316, as illustrated in FIG. 3, and interval 405 corresponds, for example, to interval 317.

FIG. 4 illustrates the effect of a routing protocol layer timer that is set to a low value, which requires frequent exchange of network routing-topology messages. This is helpful to assist new nodes to join the network, for example, but also overwhelms the transmission duty cycle. Routing-topology message transmission, such as DIO messages, takes much more time than the exchange of unicast messages using CSL. As a result, certain nodes experience interference more frequently due to collision of the broadcast messages. Node 102 will be unable to receive unicast message 404a, for example, because nodes 104 and 105 are transmitting routing topology messages during interval 406. It will be understood that FIG. 4 is a simplified diagram and that other instances of collision and interference will also occur but are not shown.

In one embodiment, the routing protocol layer timer, such as the DIO timer, alternated between a relatively short setting and a relatively long setting. Using a two-phase routing topology message period reduces the overall radio duty cycle. A DIO message, for example, is broadcast message. The reason for controlling the DIO message period is that, in a transmission-initiated protocol, the broadcast messages cannot use a short burst of strobe packets. Instead, to send a broadcast DIO message, a node needs to sends a long burst of strobe packets before the DIO data, which increases radio duty cycle and in-band interference.

FIG. 5 illustrates alternating a protocol routing layer timer interval, such as a DIO timer interval, between two different phases according to one embodiment. For each node, DIO messages 501 occur at a timer interval 502 during a first phase 503. During the first phase, the timer interval 502 is set to a small number so that the DIO messages are sent out many times during interval 503. This allows new nodes to rapidly join the network and existing nodes to update network routing topology. In the second phase 504, the timer interval 505 is set to a larger number so that the DIO messages 501 occur less frequently. This greatly reduces the interference caused by the broadcast messages and lowers the radio duty cycle and thereby requires less power consumption during the second phase 504. The first and second phases alternate and repeat over time.

The timer intervals 502, 505 of the first and second phases may be of any length selected by the network operator. The durations of the first and second phases may be selected to allow one or more interval 501 to occur during each respective phase. In one embodiment, the length of timer interval 502 in the first phase is set to 4 seconds, and the length of timer interval 505 in the second phase is set to 128 seconds. In other embodiments, the length of the second timer interval 505 is any real number multiple of the length of the first timer interval 502.

Similarly, the durations of the first and second phases may be of any length selected by the network operator. For example, the duration 503 of the first phase may be some multiple of timer interval 502, and the duration of the second phase may be some multiple of timer interval 505. In some embodiments, the first phase may last for approximately one minute, while the second phase lasts for tens of minutes, for one or more hours, or even for one or more days.

FIG. 6 is a block diagram of an exemplary embodiment of a device 600 implementing embodiments of the invention. Device 600 may be used as a node 101-107 in FIG. 1, for example. In one embodiment, device 600 is a sensor node or mote communicating with one or more other nodes or motes. In another embodiment, device 600 is a low-power wireless node.

Processor 601 processes data exchanged with other nodes or motes via radio 602 and antenna 603 and/or via wired network interface 604 coupled to the Internet or another network 605. Radio 602 may comprise transmitter and receiver sections that are adapted to support CSL and RPL protocols. Processor 601 may be a software, firmware, or hardware based device or a combination thereof. Processor 601 may also generate and process messages sent to, and received from, another device, such as using CSL and RPL protocols as described herein. Although the examples above refer to wireless protocols, it will be understood that the concepts disclosed herein are not limited to any specific protocols and may be used with wired and wireless protocols that would benefit from reducing the frequency of certain broadcast messages, such as routing layer control messages or network topology messages.

Memory 606 may be used to store DIO timers, channel sampling intervals, or other timing data, such as phase A and phase B durations. Memory 606 may also be used to store computer program instructions, software and firmware used by processor 601. It will be understood that memory 606 may be any applicable storage device, such as a fixed or removable RAM, ROM, flash memory, or disc drive that is separate from or integral to processor 601.

Device 600 may be coupled to other devices, such as user interface 607, sensors 608, or other devices or equipment 609.

It will be understood that the network 100 in FIG. 1 and the device 600 in FIG. 6 are presented for illustrative purposes only and are not intended to limit the scope of the systems or devices that are capable of employing the unscheduled access procedure described herein.

FIG. 7 is a flowchart illustrating a method or process for minimizing receiver on-time according to one embodiment. In step 701, a device activates its receiver. The receiver may be activated at predetermined channel sampling intervals. In step 702, the receiver monitors energy on a communication channel. The communication channel energy may be detected using a PHY hardware library function in the receiver in one embodiment. At step 703, the device determines whether communication channel energy has been detected. If no energy is detected, then no other device is transmitting, and the receiver is deactivated by MAC at step 704. The receiver may remain in a deactivated state until a next sampling interval.

If energy is detected in step 703, then another node may be transmitting. In step 705, a strobe packet is received. The device determines whether a destination address in the strobe packet matches its address in step 706. If the strobe packet is not addressed to the device, then the receiver is deactivated in step 707. The receiver may remain off until a next channel sampling interval. In other embodiments, the receiver may remain off for a longer period to allow other devices to transmit data packets.

If the destination address of the strobe packet matches the device, then the device activates the receiver at a rendezvous time in step 708 to receive a data packet. The rendezvous time may be identified in the strobe packet. The receiver may be turned off between receiving the strobe packet in step 705 and the rendezvous time to save power or it may remain on for that period.

In one embodiment, the period between activating and deactivating the receiver in steps 701-704 is a shorter period than a time required to receive an entire strobe packet from another device. This allows the receiver to quickly turn off if no energy is detected.

The device may activate the receiver by changing a receiver mode from an OFF state to an ON state or by changing the receiver node from a sleep state to an awake state.

In some embodiments, if energy is sensed on the communication channel by the receiver in step 703 and the device has a data packet to be transmitted, then the device may postpone transmission of the data packet by some predetermined back-off interval. This would allow other devices to complete their transmissions on the channel before the device again attempts to transmit its data.

FIG. 8 is a flowchart illustrating a method or process for transmitting network routing messages in multiple phases according to one embodiment. In step 801, a device sets a network routing message timer to a first interval during a first phase. In step 802, the device transmits a plurality of network routing messages during the first phase at the first interval. In step 803, the device sets the network routing message timer to a second interval during a second phase. In step 804, the device transmits a plurality of network routing messages during the second phase at the second interval.

The first interval and the second interval may be selected to minimize interference between network routing messages and strobe packets transmitted in the network. In one embodiment, the network routing message is a DODAG Information Object (DIO) message.

It will be understood that steps 701-708 of the process illustrated in FIG. 7 and steps 801-804 in FIG. 8 may be executed simultaneously and/or sequentially. It will be further understood that each step may be performed in any order and may be performed once or repetitiously.

Many of the functions described herein may be implemented in hardware, software, and/or firmware, and/or any combination thereof. When implemented in software, code segments perform the necessary tasks or steps. The program or code segments may be stored in a processor-readable, computer-readable, or machine-readable medium. The processor-readable, computer-readable, or machine-readable medium may include any device or medium that can store or transfer information. Examples of such a processor-readable medium include an electronic circuit, a semiconductor memory device, a flash memory, a ROM, an erasable ROM (EROM), a floppy diskette, a compact disk, an optical disk, a hard disk, a fiber optic medium, etc.

The software code segments may be stored in any volatile or non-volatile storage device, such as a hard drive, flash memory, solid state memory, optical disk, CD, DVD, computer program product, or other memory device, that provides computer-readable or machine-readable storage for a processor or a middleware container service. In other embodiments, the memory may be a virtualization of several physical storage devices, wherein the physical storage devices are of the same or different kinds. The code segments may be downloaded or transferred from storage to a processor or container via an internal bus, another computer network, such as the Internet or an intranet, or via other wired or wireless networks.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

What is claimed is:

1. A device, comprising:
a transmitter for sending signals to another device;
a receiver for receiving signals from another device; and
a processor adapted to control the transmitter and receiver and to process the signals sent to or received from another device, the processor operating to:
set a broadcast message timer to a first interval during a first phase;
transmit a plurality of broadcast messages during the first phase at the first interval;
set the broadcast message timer to a second interval during a second phase;
transmit a plurality of broadcast messages during the second phase at the second interval; and
each of the first interval and the second interval including a series of strobe messages followed by a data packet message.

2. The device of claim 1, in which the broadcast message is a routing protocol control message.

3. The device of claim 2, in which the routing protocol control message is a DODAG Information Object (DIO) message, and the broadcast message timer is a DIO timer.

4. The device of claim 1, wherein a length of the second interval is a multiple of the length of the first interval.

5. The device of claim 1, wherein a duration of the first phase is a multiple of the first interval, and a duration of the second phase is a multiple of the second interval.

6. The device of claim 1 in which a duration of the first interval is different from a duration of the second interval.

7. The device of claim 1 in which a duration of the first interval is less than a duration of the second interval.

8. A method, comprising:
setting a broadcast message timer to a first interval during a first phase;
transmitting a plurality of broadcast messages during the first phase at the first interval;
setting the broadcast message timer to a second interval during a second phase;
transmitting a plurality of broadcast messages during the second phase at the second interval; and
each of the first interval and the second interval comprising a series of strobe messages followed by a data packet message.

9. The method of claim 8, in which the broadcast message is a routing protocol control message.

10. The method of claim 9, in which the routing protocol control message is a DODAG Information Object (DIO) message, and the broadcast message timer is a DIO timer.

11. The method of claim 8, wherein a length of the second interval is a multiple of the length of the first interval.

12. The method of claim 8, wherein a duration of the first phase is a multiple of the first interval, and a duration of the second phase is a multiple of the second interval.

13. The method of claim 8, wherein the broadcast timer is stored in a memory.

14. The method of claim 8 in which a duration of the first interval is different from a duration of the second interval.

15. The method of claim 8 in which a duration of the first interval is less than a duration of the second interval.

16. A non-transitory electronic storage medium having program instructions stored thereon that, upon execution by a processor within a device, cause the device to:
   set a broadcast message timer to a first interval during a first phase;
   transmit a plurality of broadcast messages during the first phase at the first interval;
   set the broadcast message timer to a second interval during a second phase;
   transmit a plurality of broadcast messages during the second phase at the second interval; and
   each of the first interval and the second interval comprising a series of strobe messages followed by a data packet message.

17. The non-transitory electronic storage medium of claim 16, in which the broadcast message is a routing protocol control message.

18. The non-transitory electronic storage medium of claim 17, in which the routing protocol control message is a DODAG Information Object (DIO) message, and the broadcast message timer is a DIO timer.

19. The non-transitory electronic storage medium of claim 16, wherein a length of the second interval is a multiple of the length of the first interval.

20. The non-transitory electronic storage medium of claim 16, wherein a duration of the first phase is a multiple of the first interval, and a duration of the second phase is a multiple of the second interval.

21. The non-transitory electronic storage medium of claim 16, wherein the broadcast timer is stored in a memory.

22. The non-transitory electronic storage medium of claim 16 in which a duration of the first interval is different from a duration of the second interval.

23. The non-transitory electronic storage medium of claim 16 in which a duration of the first interval is less than a duration of the second interval.

\* \* \* \* \*